(12) United States Patent
Park et al.

(10) Patent No.: US 11,051,251 B2
(45) Date of Patent: Jun. 29, 2021

(54) HARDWARE RESET CONTROL METHOD AND ELECTRONIC DEVICE

(71) Applicant: SAMSUNG ELECTRONICS CO., LTD., Suwon-si (KR)

(72) Inventors: Junghui Park, Suwon-si (KR); Minsoo Kim, Suwon-si (KR); Chanhun Yun, Suwon-si (KR); Jinkyu Kim, Suwon-si (KR); Jiwoo Lee, Suwon-si (KR); Yeunwook Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/104,471

(22) Filed: Nov. 25, 2020

(65) Prior Publication Data

US 2021/0160783 A1 May 27, 2021

(30) Foreign Application Priority Data

Nov. 25, 2019 (KR) .......................... 10-2019-0152309

(51) Int. Cl.
*H04W 52/02* (2009.01)
*H04W 4/80* (2018.01)

(52) U.S. Cl.
CPC ......... *H04W 52/0251* (2013.01); *H04W 4/80* (2018.02); *H04W 52/0212* (2013.01); *H04W 52/0229* (2013.01)

(58) Field of Classification Search
CPC ............... H04W 52/0251; H04W 4/80; H04W 52/0212; H04W 52/0229
See application file for complete search history.

(56) References Cited

U.S. PATENT DOCUMENTS

| | | | |
|---|---|---|---|
| 7,155,619 B2 * | 12/2006 | Tsai | H03K 17/223 713/320 |
| 8,432,196 B2 | 4/2013 | Lee et al. | |
| 2010/0331057 A1 | 12/2010 | Tanaka | |
| 2011/0143809 A1 * | 6/2011 | Salomons | G06F 1/24 455/550.1 |
| 2012/0038397 A1 * | 2/2012 | Lee | H03K 17/22 327/142 |

(Continued)

FOREIGN PATENT DOCUMENTS

| | | |
|---|---|---|
| CN | 206498386 | 9/2017 |
| JP | 2019-117565 | 7/2019 |

(Continued)

OTHER PUBLICATIONS

International Search Report and Written Opinion dated Mar. 15, 2021 in corresponding International Application No. PCT/KR2020/016835.

*Primary Examiner* — David Bilodeau

(74) *Attorney, Agent, or Firm* — Nixon & Vanderhye, P.C.

(57) ABSTRACT

The disclosure relates to a method for providing hardware reset in an electronic device having at least one non-physical key and the electronic device thereof, and an operating method of the electronic device may include detecting a current amount supplied to a processor, detecting whether wireless power is input, generating a hardware reset signal based on the detected current amount and the wireless power input, and transmitting the generated hardware reset signal to the processor.

15 Claims, 12 Drawing Sheets

(56) References Cited

U.S. PATENT DOCUMENTS

| | | | |
|---|---|---|---|
| 2012/0235715 A1* | 9/2012 | Lee | H03K 17/22 327/142 |
| 2014/0009376 A1* | 1/2014 | Files | H02J 9/005 345/102 |
| 2018/0159345 A1 | 6/2018 | Lin | |
| 2018/0375511 A9 | 12/2018 | Schnaitter et al. | |
| 2019/0346905 A1 | 11/2019 | Song et al. | |

FOREIGN PATENT DOCUMENTS

| KR | 10-2018-0064264 | 6/2018 |
|---|---|---|
| KR | 10-2018-0071775 | 6/2018 |
| KR | 10-2019-0080525 | 7/2019 |

\* cited by examiner

HARDWARE RESET CONTROL METHOD AND ELECTRONIC DEVICE

CROSS-REFERENCE TO RELATED APPLICATION

This application is based on and claims priority under 35 U.S.C. § 119 to Korean Patent Application No. 10-2019-0152309, filed on Nov. 25, 2019, in the Korean Intellectual Property Office, the disclosure of which is incorporated by reference herein in its entirety.

BACKGROUND

Field

The disclosure relates to a hardware reset control method in an electronic device having no separate input port, and the electronic device thereof.

Description of Related Art

An electronic device typically includes an input sensor or a button for receiving a user's input. To notify a user of a position of the input sensor or the button, the electronic device generally includes a key indicator protruded or recessed, to allow the user to input the key by pressing the key indicator position.

A physical key indicator may impose limitations on a design of an electronic device, and accordingly a keyless structure without the physical key indicator is considered.

A conventional electronic device including a physical key may reset hardware using a volume key and a power key. However, if the physical key is not included and is replaced by an input sensor module such as a strain gauge sensor and an error occurs at the input sensor module, the input sensor module may not operate and thus the hardware may not be reset.

SUMMARY

Embodiments of the disclosure provide a method for resetting hardware by radio such as wireless charging or near field communication (NFC) in a keyless electronic device having no physical key.

According to various example embodiments of the disclosure, an electronic device may include: a wireless power module including circuitry configured to receive wireless power, a processor, and a power management integrated circuit (PMIC) configured to manage power supplied to the processor, wherein the wireless power module, the processor, and the PMIC may be connected with a line and configured to transmit an alarm signal notifying that the wireless power is being input.

According to various example embodiments of the disclosure, a method of operating an electronic device having no (or a reduced number of, e.g., at least one non-physical key)external physical key(s) may include: detecting a current amount supplied to a processor, detecting whether wireless power is input, generating a hardware reset signal based on the detected current amount and the wireless power input, and transmitting the generated hardware reset signal to the processor.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

Throughout the drawings, like reference numerals will be understood to refer to like parts, components and structures.

DETAILED DESCRIPTION

Various example embodiments are described in greater detail with reference to the attached drawings.

Figure 1:
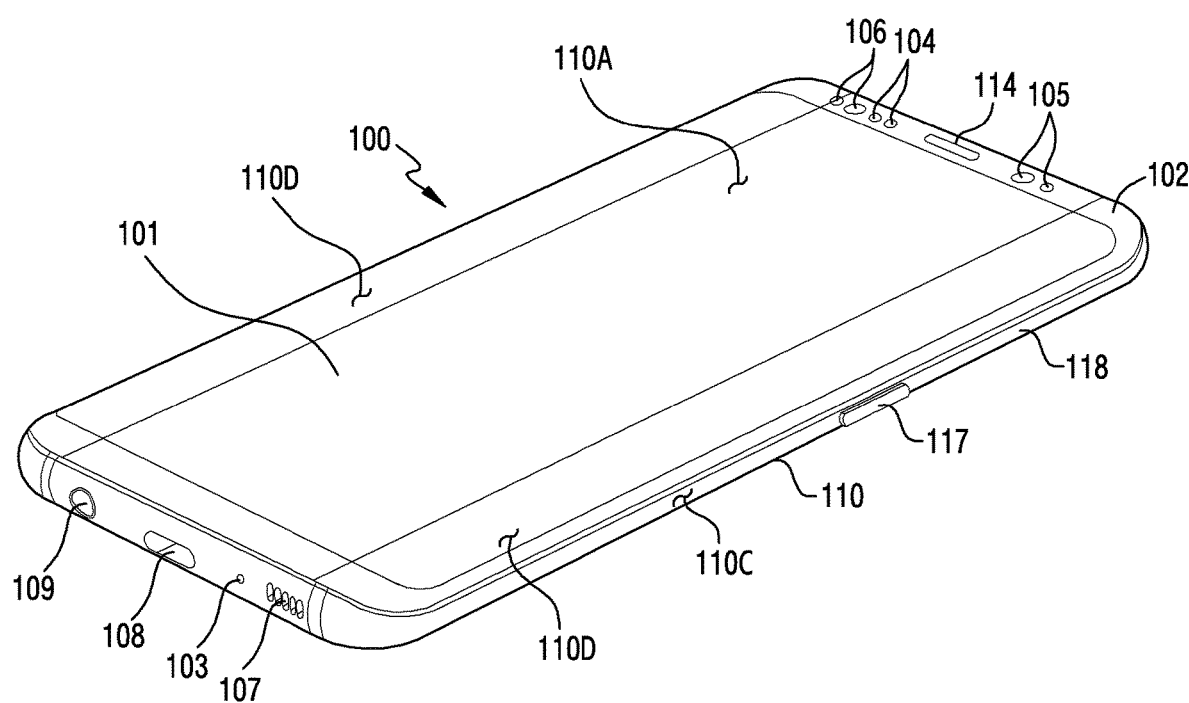
FIG. 1 is a front perspective view illustrating an example mobile electronic device according to various embodiments.

FIG. 1 is a front perspective view illustrating an example mobile electronic device according to various embodiments.

Figure 2:
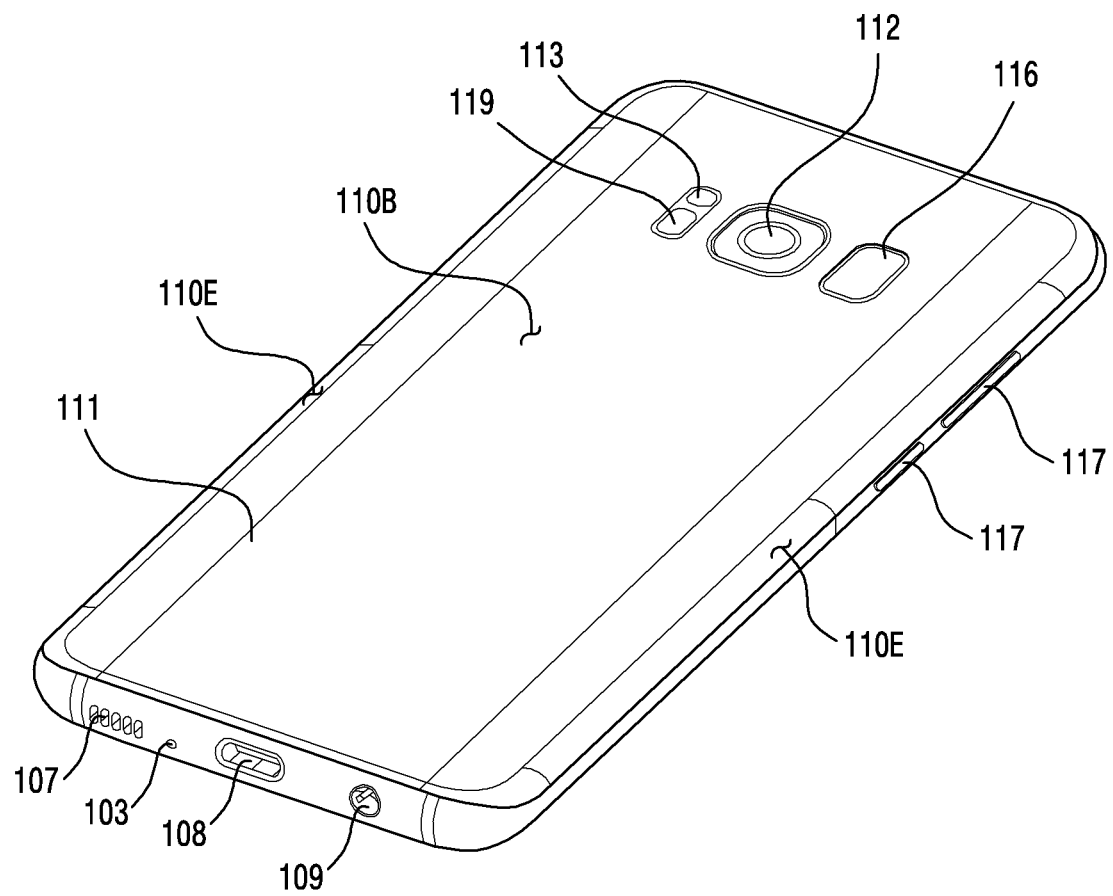
FIG. 2 is a rear perspective view of the electronic device of FIG. 1 according to various embodiments.

FIG. 2 is a rear perspective view illustrating the electronic device of FIG. 1 according to various embodiments.

Figure 3:
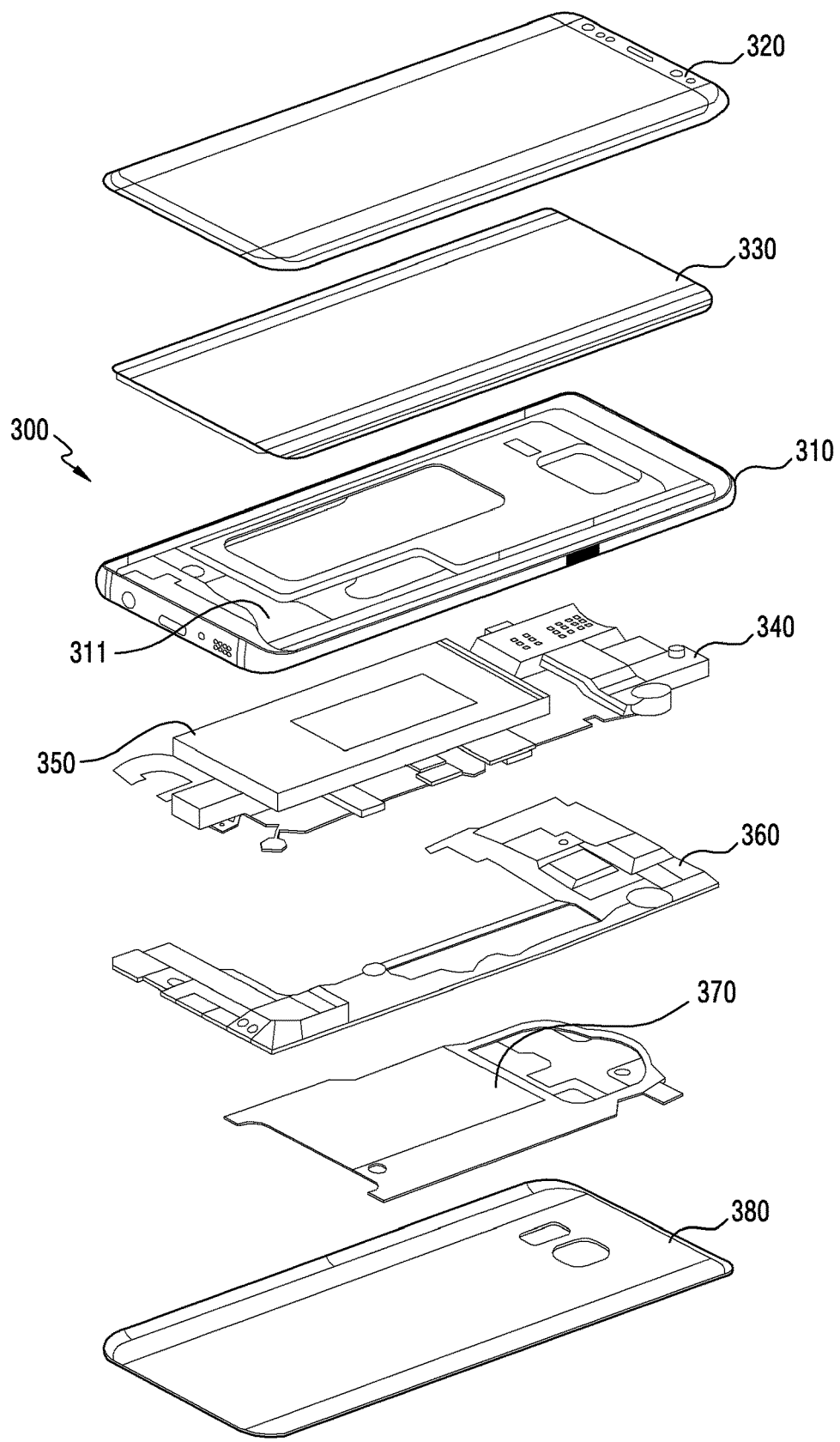
FIG. 3 is an exploded perspective view of the electronic device of FIG. 1 according to various embodiments.

FIG. 3 is an exploded perspective view of illustrating the electronic device of FIG. 1 according to various embodiments.

Referring to FIG. 1 and FIG. 2, an electronic device 100 according to an embodiment may include a housing 110 including a first surface (or a front surface) 110A, a second surface (or a rear surface) 110B, and a side surface 110C surrounding a space between the first surface 110A and the second surface 110B. In an embodiment (not shown), the housing may indicate a structure which forms part of the first surface 110A, the second surface 110B, and the side surface 110C of FIG. 1. According to an embodiment, the first surface 110A may be formed with a front plate 102 (e.g., a glass plate including various coating layers, or a polymer plate) which is at least in part transparent. The second surface 110B may be formed with a substantially opaque rear plate 111. The rear plate 111 may be formed of, for example, a coated or pigmented glass, ceramic, polymer, or metal (e.g., aluminum, stainless steel (STS), or magnesium), or a combination of at least two of them. The side surface 110C may be coupled with a front plate 102 and a rear plate 111, and may be formed with a side bezel structure (or a "side member") 118 including metal and/or polymer. In some embodiment, the rear plate 111 and the side bezel structure 118 may be integrally formed and include the same material (e.g., a metal material such as aluminum).

In this embodiment, the front plate 102 includes two first regions 110D which are bended from the first surface 110A toward the rear plate 111 to seamlessly extend, at both long edges of the front plate 102. In this embodiment of FIG. 2, the rear plate 111 may include two second regions 110E which are bended from the second surface 110B toward the front plate 102 to seamlessly extend at both long edges. In some embodiment, the front plate 102 (or the rear plate 111) may include only one of the first regions 110D (or the second regions 110E). In an embodiment, some of the first regions 110D or the second regions 110E may be not included. In the above embodiments, when viewed from a side surface of the electronic device 100, the side bezel structure 118 may have a first thickness (or width) on the side surface not including the first regions 110D or the second regions 110E as above, and may have a second thickness smaller than the first thickness on the side surface including the first regions 110D or the second regions 110E.

According to an embodiment, the electronic device 100 may include at least one or more of a display 101, audio modules 103, 107, and 114, sensor modules 104, 116, and 119, camera modules 105, 112, and 113, a key input device 117, a light emitting device 106, and connector holes 108 and 109. In some embodiment, the electronic device 100 may omit at least one of the components (e.g., the key input device 117, or the light emitting device 106) or may further include other component.

The display 101 may be visible through, for example, the most part of the front plate 102. In some embodiment, at least part of the display 101 may be exposed through the front plate 102 which forms the first surface 110A and the first regions 110D of the side surface 110C. In some embodiment, a corner of the display 101 may be formed in substantially the same shape as an outer periphery adjacent to the front plate 102. In an embodiment (not shown), to increase the area of the exposed display 101, a spacing between the outer periphery of the display 101 and the outer periphery of the front plate 102 may be formed to be substantially identical.

In an embodiment (not shown), a recess or an opening may be formed in a part of a screen display area of the display 101, to include at least one or more of the audio module 114, the sensor module 104, the camera module 105, and the light emitting device 106 aligned with the recess or the opening. In an embodiment (not shown), the back surface of the screen display area of the display 101 may include at least one or more of the audio module 114, the sensor module 104, the camera module 105, the fingerprint sensor 116, and the light emitting device 106. In an embodiment (not shown), the display 101 may be coupled to or arranged adjacent to a touch sensing circuit, a pressure sensor for measuring a touch level (pressure), and/or a digitizer for detecting a magnetic field-type stylus pen. In some embodiment, at least part of the sensor module 104 and 119 and/or at least part of the key input device 117 may be disposed in the first regions 110D and/or the second regions 110E.

The audio modules 103, 107 and 114 may include a microphone hole 103 and speaker holes 107 and 114. The microphone hole 103 may include therein a microphone for acquiring an external sound, and may include a plurality of microphones for detecting a direction of the sound in some embodiment. The speaker holes 107 and 114 may include an outer speaker hole 107 and a speech receiver hole 114. In some embodiment, the speaker holes 107 and 114 and the microphone hole 103 may be implemented as a single hole, or a speaker (e.g., a piezoelectric speaker) may be included without the speaker holes 107 and 114.

The sensor modules 104, 116, and 119 may generate an electric signal or a data value corresponding to an internal operating condition or an external environment condition of the electronic device 100. The sensor modules 104, 116, and 119 may include, for example, a first sensor module 104 (e.g., a proximity sensor) and/or a second sensor module (not shown) (e.g., a fingerprint sensor) on the first surface 110A of the housing 110, and/or a third sensor module 119 (e.g., a heart rate monitor (HRM) sensor) and/or a fourth sensor module 116 (e.g., a fingerprint sensor) on the second surface 110B of the housing 110. The fingerprint sensor may be disposed on the second surface 110B as well as the first surface 110A (e.g., the display 101) of the housing 110. The electronic device 100 may further include a sensor module (not shown), for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or a luminance sensor 104.

The camera modules 105, 112, and 113 may include a first camera device 105 disposed on the first surface 110A of the electronic device 100, a second camera device 112 disposed on the second surface 110B, and/or a flash 113. The camera devices 105 and 112 may include one or more lenses, an image sensor, and/or an image signal processor. The flash 113 may include, for example, a light emitting diode or a xenon lamp. In some embodiment, two or more lenses (an infrared camera, a wide-angle lens and a telephoto lens) and image sensors may be disposed on one surface of the electronic device 100.

The key input device 117 may be disposed on the side surface 110C of the housing 110. In an embodiment, the electronic device 100 may not include part or whole of the key input device 117, and the key input device 117 not included may be implemented in another manner such as a soft key, on the display 101 or may be implemented as an input sensor such as a sensor module (e.g., a strain gauge sensor) disposed on the side surface 110C of the housing 110. In some embodiment, the key input device 117 may include the sensor module 116 on the second surface 110B of the housing 110.

The light emitting device 106 may be disposed on, for example, the first surface 110A of the housing 110. The light emitting device 106 may provide, for example, state information of the electronic device 100 using light. In an embodiment, the light emitting device 106 may provide a light source associated with, for example, the camera module 105. The light emitting device 106 may include, for example, an LED, an IR LED, and a xenon lamp.

The connector holes 108 and 109 may include a first connector hole 108 for receiving a connector (e.g., a universal serial bus (USB) connector) for transmitting and receiving power and/or data to and from an external electronic device, and/or a second connector hole (e.g., an earphone jack) 109 for receiving a connector for transmitting and receiving an audio signal to and from the external electronic device.

Referring to FIG. 3, an electronic device 300 may include a side bezel structure 310, a first support member 311 (e.g., a bracket), a front plate 320, a display 330, a printed circuit board 340, a battery 350, a second support member 360 (e.g., a rear case), an antenna 370, and a rear plate 380. In some embodiment, the electronic device 300 may omit at least one of the components (e.g., the first support member 311 or the second support member 360), or may further include other component. At least one of the components of the electronic device 300 may be identical or similar to at least one of the components of the electronic device 100 of FIG. 1 or FIG. 2, which shall be omitted in the following descriptions.

The first support member 311 may be disposed inside the electronic device 300 and connected to the side bezel structure 310, or may be formed integrally with the side bezel structure 310. The first support member 311 may be formed of, for example, a metal material and/or a nonmetal material (e.g., a polymer). The first support member 311 may be coupled with the display 330 on one surface and coupled with the printed circuit board 340 on the other surface. A processor, a memory, and/or an interface may be mounted on the printed circuit board 340. The processor may include, for example, one or more of a central processing device, an application processor, a graphic processing unit (GPU), an image signal processor, a sensor hub processor, or a communication processor.

The memory may include, for example, a volatile memory or a non-volatile memory.

The interface may include, for example, a high definition multimedia interface (HDMI), a USB interface, a secure digital (SD) card interface, and/or an audio interface. The interface may, for example, electrically or physically connect the electronic device 300 with an external electronic device, and may include a USB connector, an SD card/MMC connector, or an audio connector.

The battery 350 supplies power to at least one component of the electronic device 300, and may include a non-rechargeable primary cell, a rechargeable secondary cell, or a fuel cell. At least part of the battery 350 may be disposed on substantially the same plane as the printed circuit board 340. The battery 350 may be integrally disposed inside the electronic device 300, or may be disposed to be attached/detached to/from the electronic device 300.

The antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 may, for example, conduct short-range communication with an external device, or wirelessly transmit/receive the charging power. In an embodiment, the antenna structure may be formed by part or a combination of the side bezel structure 310 and/or the first support member 311.

Figure 4:
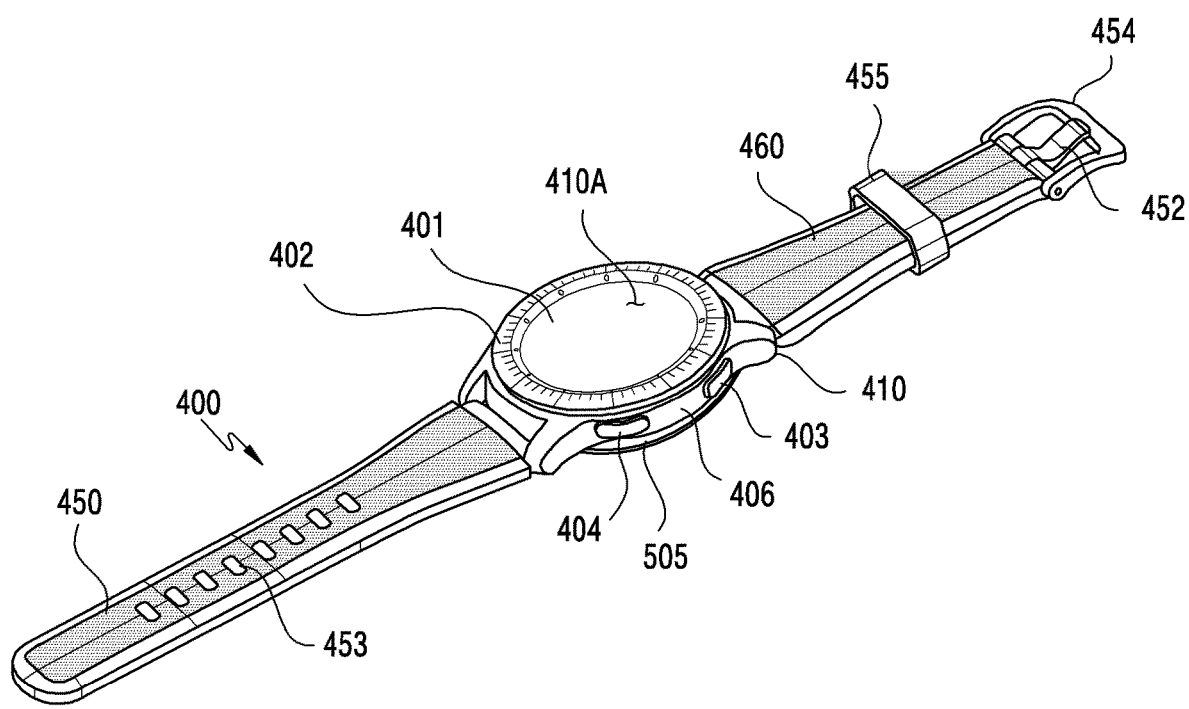
FIG. 4 is a front perspective view illustrating an example mobile electronic device according to various embodiments.

FIG. 4 is a front perspective view illustrating an example mobile electronic device according to various embodiments.

Figure 5:
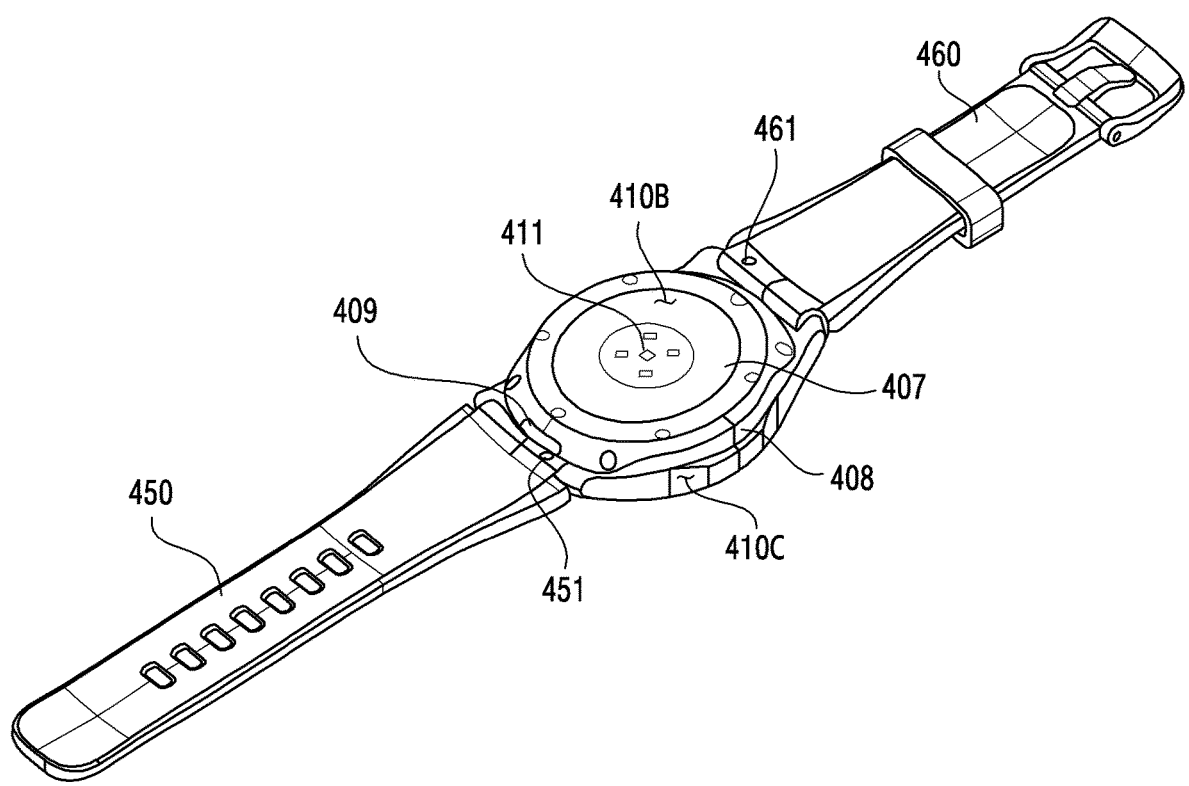
FIG. 5 is a rear perspective view of the electronic device of FIG. 4 according to various embodiments.

FIG. 5 is a rear perspective view of the electronic device of FIG. 4 according to various embodiments.

Figure 6:
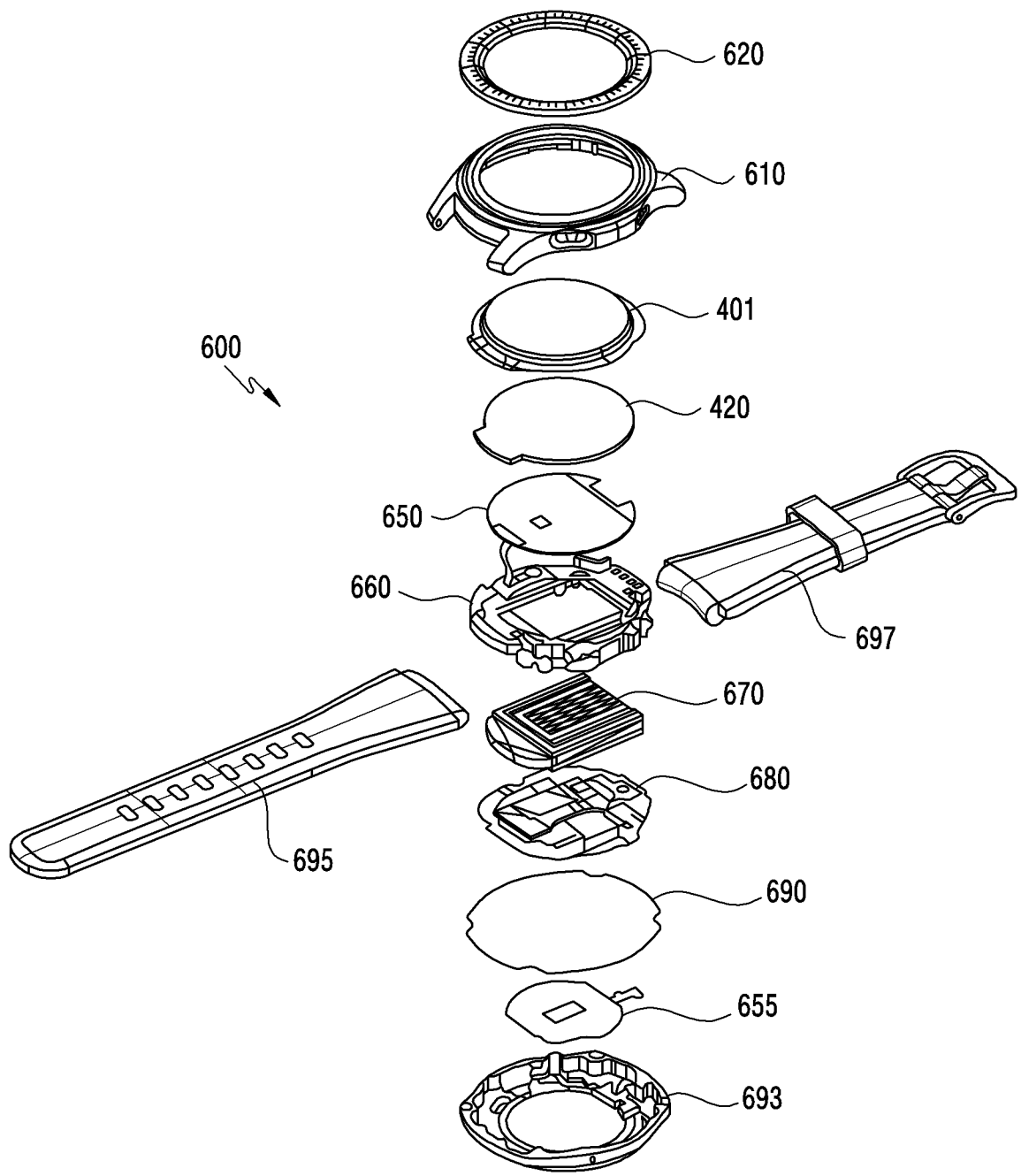
FIG. 6 is an exploded perspective view of the electronic device of FIG. 4 according to various embodiments.

FIG. 6 is an exploded perspective view of the electronic device of FIG. 4 according to various embodiments.

Referring to FIG. 4 and FIG. 5, an electronic device 400 according to an embodiment may include a housing 410 including a first surface (or a front surface) 410A, a second surface (or a rear surface) 410B, and a side surface 410C surrounding a space between the first surface 410A and the second surface 410B, and coupling members 450 and 460 connected to at least part of the housing 410 and detachably coupling the electronic device 400 to a user's body part (e.g., a wrist, an ankle, etc.). In other embodiment (not shown), the housing may indicate a structure which forms part of the first surface 410A, the second surface 410B, and the side surface 410C of FIG. 4. According to an embodiment, the first surface 410A may be formed with a front plate 401 (e.g., a glass plate including various coating layers, or a polymer plate) which is substantially at least in part transparent. The second surface 410B may be formed with a substantially opaque rear plate 407. The rear plate 407 may be formed of, for example, a coated or pigmented glass, ceramic, polymer, or metal (e.g., aluminum, STS, or magnesium), or a combination of at least two of them. The side surface 410C may be coupled with the front plate 401 and the rear plate 407, and may be formed by a side bezel structure (e.g., a "side member") 406 including metal and/or polymer. In some embodiment, the rear plate 407 and the side bezel structure 406 may be integrally formed and include the same material (e.g., a metal material such as aluminum). The coupling members 450 and 460 may be formed with various materials in various shapes. An integral or multiple unit links may be formed to be flexible by use of fabric, leather, rubber, urethane, metal, ceramic, or a combination of at least two thereof.

According to an embodiment, the electronic device 400 may include at least one or more of a display 420 (FIG. 6), audio modules 505 and 408, a sensor module 411, key input devices 402, 403, and 404, and a connector hole 409. In some embodiment, the electronic device 400 may omit at least one (e.g., the key input devices 402, 403, and 404, the connector hole 409, or the sensor module 411) of the components or may further include other component.

The display 420 may be visible through, for example, the most part of the front plate 401. The display 420 may have a shape corresponding to the shape of the front plate 401, in various shapes such as a circle, an oval, or a polygon. The display 420 may be coupled with or disposed adjacent to a touch sensing circuit, a pressure sensor for measuring a touch level (pressure), and/or a fingerprint sensor.

The audio modules 505 and 408 may include a microphone hole 505 and a speaker hole 408. The microphone hole 505 may include a microphone therein to acquire an external sound, and may include a plurality of microphones for detecting a direction of the sound in some embodiment. The speaker hole 408 may be used as an outer speaker hole and a speech receiver hole. In some embodiment, the speaker hole 408 and the microphone hole 505 may be implemented as a single hole, or a speaker (e.g., a piezoelectric speaker) may be included without the speaker hole 408.

The sensor module 411 may include various sensors and/or sensing circuitry and generate an electric signal or a data value corresponding to an internal operating condition or an external environment condition of the electronic device 400. The sensor module 411 may include, for example, a biometric sensor module 411 (e.g., an HRM sensor) on the second surface 410B of the housing 410. The electronic device 400 may further include a sensor module (not shown), for example, at least one of a gesture sensor, a gyro sensor, an atmospheric pressure sensor, a magnetic sensor, an acceleration sensor, a grip sensor, a color sensor, an IR sensor, a biometric sensor, a temperature sensor, a humidity sensor, or a luminance sensor.

The key input devices 402, 403, and 404 may include a wheel key 402 disposed on the first surface 410A of the housing 410 and rotating in at least one direction, and/or side key buttons 403 and 404 disposed on the side surface 410C of the housing 410. The wheel key 402 may have a shape corresponding to the shape of the front plate 401. In other embodiment, the electronic device 400 may not include all or some of the above-mentioned key input devices 402, 403, and 404, and the key input devices 402, 403, and 404 not included may be implemented in other manner such as soft keys on the display 420. The connector hole 409 may include another connector hole (not shown) for receiving a connector (e.g., a USB connector) for transmitting and receiving power and/or data to and from an external electronic device and a connector for transmitting and receiving audio signals to and from the external electronic device. The electronic device 400 may further include, for example, a connector cover (not shown) which covers at least part of the connector hole 409 and prevents an undesirable material from entering the connector hole 409.

The coupling members 450 and 460 may detachably be coupled to at least some portion of the housing 410 using locking members 451 and 461. The coupling members 450 and 460 may include one or more of a fastening member 452, fastening member coupling holes 453, a band guide member 454, and a band fastening ring 455.

The fastening member 452 may be configured to fasten the housing 410 and the coupling members 450 and 460 to a user's body part (e.g., a wrist, an ankle, etc.). The fastening member coupling holes 453 may fasten the housing 410 and the coupling members 450 and 460 to the user's body part, corresponding to the fastening member 452. The band guide member 454 may be configured to restrict a movement range of the fastening member 452 in fastening the fastening member 352 into the fastening member coupling holes 453, and thus the coupling members 450 and 460 may be tightly fastened onto the user's body part. The band fastening ring 455 may limit the movement range of the coupling members 450 and 460, while the fastening member 452 and the fastening memory coupling holes 453 are fastened.

Referring to FIG. 6, an electronic device 600 may include a side bezel structure 610, a wheel key 620, a front plate 401, a display 420, a first antenna 650, a second antenna 655, a support member 660 (e.g., a bracket), a battery 670, a printed circuit board 680, a sealing member 690, a rear plate 693, and fastening members 695 and 697. At least one of the components of the electronic device 600 may be identical or similar to at least one of the components of the electronic device 400 of FIG. 4 or FIG. 5, which may not be repeated in the following descriptions. The support member 660 may be disposed inside the electronic device 600 and connected to the side bezel structure 610, or may be formed integrally with the side bezel structure 610. The support member 660 may be formed of, for example, a metal material and/or a nonmetal material (e.g., a polymer). The support member 660 may be coupled with the display 420 on one surface and with the printed circuit board 680 on the other surface. A processor, a memory, and/or an interface may be mounted on the printed circuit board 680. The processor may include, for example, one or more of a central processing device, an application processor, a GPU, an image signal processor, a sensor hub processor, or a communication processor.

The memory may include, for example, a volatile memory or a non-volatile memory. The interface may include, for example, an HDMI, a USB interface, an SD card interface, and/or an audio interface. The interface may, for example, electrically or physically connect the electronic device 600 with an external electronic device, and may include a USB connector, an SD card/MMC connector, or an audio connector.

The battery 670 supplies power to at least one component of the electronic device 600, and may include a non-rechargeable primary cell, a rechargeable secondary cell, or a fuel cell. At least part of the battery 650 may be disposed on substantially the same plane as the printed circuit board 680. The battery 670 may be integrally disposed inside the electronic device 600, or may be disposed to be attached and detached to and from the electronic device 600.

The first antenna 650 may be disposed between the display 420 and the support member 660. The first antenna 650 may include, for example, an NFC antenna, a wireless charging antenna, and/or an MST antenna. The first antenna 650 may conduct short-range communication with an external device, or wirelessly transmit/receive the charging power, and transmit a magnetic-based signal including a short-range communication signal or payment data. In other embodiment, the antenna structure may be formed by part or a combination of the side bezel structure 610 and/or the support member 660.

The second antenna 655 may be disposed between the circuit board 680 and the rear plate 693. The second antenna 655 may include, for example, an NFC antenna, a wireless charging antenna, and/or an MST antenna. The second antenna 655 may conduct short-range communication with an external device, or wirelessly transmit and receive the charging power, and transmit a magnetic-based signal including a short-range communication signal or payment data. In other embodiment, the antenna structure may be formed using part or a combination of the side bezel structure 610 and/or the rear plate 693.

The sealing member 690 may be disposed between the side bezel structure 610 and the rear plate 693. The sealing member 690 may be configured to block moisture and a foreign matter from entering a space surrounded by the side bezel structure 610 and the housing 693.

Figure 7:
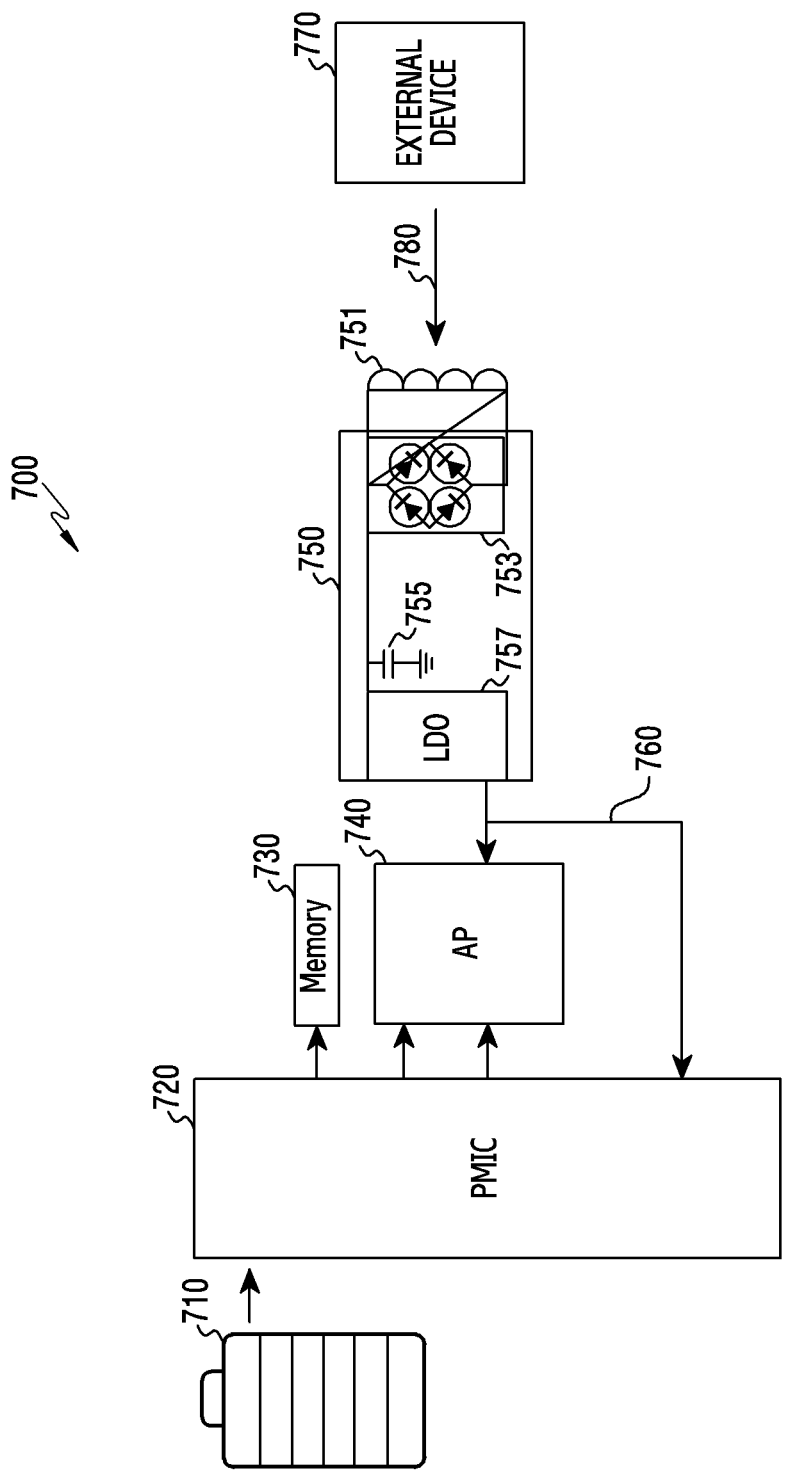
FIG. 7 is a circuit diagram illustrating an example configuration for hardware reset in an electronic device according to various embodiments.

FIG. 7 is a circuit diagram 700 illustrating an example configuration for hardware reset in an electronic device 100 or 400 according to various embodiments.

Referring to FIG. 7, the electronic device 100 or 400 may include a power management integrated circuit (PMIC) 720 and a wireless power module (e.g., including power receiving circuitry) 750 for the hardware reset. The electronic device 100 or 400 may include a processor (e.g., including processing circuitry) 740, a memory 730, and a battery 710.

According to various embodiments, the PMIC 720 may manage power supplied from the battery 710 to the processor 740 and the memory 730 which is operatively connected to the processor 740. For example, the PMIC 720 may measure a current amount supplied to the processor 740.

According to various embodiments, the wireless power module 750 may include various power receiving circuitry and wirelessly receive power from outside (e.g., an external device 770). According to an embodiment, the wireless power module 750 may include, but not limited to, a wireless charging module or an NFC module, and may correspond any module capable of wirelessly receiving the power from outside regardless of the operation of the electronic device 100 or 400.

Referring to FIG. 7, the wireless power module 750 may include a loop coil 751, a rectifier 753, and a capacitor 755. The wireless power module 750 may further include a low dropout (LDO) regulator 757. In addition, the wireless power module 750 may connect a signal line 760 indicating the wireless power received, to the PMIC 720.

According to various embodiments, the wireless power module 750 may receive alternating current power 780 from the external device 770 using the loop coil 751.

The rectifier 753 may convert the alternating current power 780 to direct current power through a full bridge diode. The direct current power output from the rectifier 753 may be stored in the capacitor 755 of the wireless power module 750. The capacitor 755 is charged with the direct current power from the rectifier 753 and reaches a specific voltage level, for example, exceeds an under voltage lock out (UVLO) voltage level, the capacitor 755 may supply the power to the LDO regulator 757. The LDO regulator 757 receiving the power may transmit an alarm signal notifying that the wireless power is received through the signal line 760, to the PMIC 720. According to an embodiment, the LDO regulator 757 may convert the voltage of the signal line 760 from 0 V to 1.8 V. According to an embodiment, if the capacitor 755 is charged over the specific voltage level, the wireless power module 750 may convert the voltage of the signal line 760 from 0V to other voltage (e.g., 1.8 V or 2.5 V) without using the LDO regulator 757, wherein the PMIC 720 recognizes it.

According to various embodiments, the PMIC 720 may perform the hardware reset, if receiving the alarm signal notifying the received wireless power from the wireless power module 750 through the signal line 760. Typically, in an infinite loop at the same position due to an error or a bug of software or an application running on the processor 740, that is, in the lock state, the electronic device 100 or 400 stops every function and thus requires the hardware reset. Since the wireless power module 750 performs the wireless charging function and the NFC function in the normal condition, the PMIC 720 may perform the hardware reset based on a signal from the wireless power module 750 if determining that the electronic device 100 or 400 requires the hardware reset. Hence, the PMIC 720 may determine whether the electronic device 100 or 400 is locked based on the current amount supplied to the processor 740. In an embodiment, if the electronic device 100 or 400 is locked, the current amount supplied to the electronic device 100 or 400 may have no change or may change within a fine range (e.g., ±1 mA). Thus, if the current amount supplied to the electronic device 100 or 400 has no substantial change and the alarm signal is received from the wireless power module 750, the PMIC 720 may generate and transmit a hardware reset signal to the processor 740. According to an embodiment, if the current amount supplied to the electronic device 100 or 400 has no substantial change and the alarm signal is continuously received from the wireless power module 750 over a specific time (e.g., 7 seconds), the PMIC 720 may generate and transmit a hardware reset signal to the processor 740.

In an embodiment, the PMIC 720 may include a buck circuit (not shown) for supplying the power to the processor 740. In an embodiment, the PMIC 720 may measure a magnitude and/or a waveform of the current supplied from the buck circuit to the processor 740, and determine whether the current amount changes. According to whether the current amount changes, the PMIC 720 may determine whether the processor 740 of the electronic device 100 or 400 is locked.

The hardware reset by applying the wireless power using the wireless charging or the NFC may be used in not only the smart phone of FIG. 1, FIG. 2, and FIG. 3 or the smart watch of FIG. 4, FIG. 5, and FIG. 6, but also any electronic device (e.g., a stylus pen or a computer device such as a tablet PC or a laptop computer) having no physical key.

According to various example embodiments, an electronic device (e.g., the electronic device 100 of FIG. 1 or the electronic device 400 of FIG. 4) having at least one non-physical key may include a wireless power module (e.g., the wireless power module 750 of FIG. 7) including circuitry configured to receive wireless power, a processor (e.g., the processor 740 of FIG. 7), and a PMIC (e.g., the PMIC 720 of FIG. 7) configured to manage power supplied to the processor, wherein the wireless power module, the processor, and the PMIC may be connected with a line (e.g., the signal line 760 of FIG. 7) configured to transmit an alarm signal notifying that the wireless power is input.

According to various example embodiments, based on a current amount supplied to the processor having no substantial change and the alarm signal notifying that the wireless power input being received from the wireless power module, the PMIC may generate and transmit a hardware reset signal for hardware reset to the processor.

According to various example embodiments, based on the current amount supplied to the processor having no substantial change over a first predesignated time and the alarm signal notifying the wireless power input being received from the wireless power module, the PMIC may be configured to generate and transmit the hardware reset signal to the processor.

According to various example embodiments, based on the current amount supplied to the processor having no substantial change over a first predesignated time and the alarm signal notifying the wireless power input being received from the wireless power module over a second predesignated time, the PMIC is configured to generate and transmit the hardware reset signal to the processor.

According to various example embodiments, the wireless power module may include an antenna configured to receive wireless power, a rectifier (e.g., the rectifier 753 of FIG. 7) configured to convert alternating current power received via the antenna to direct current power, and a capacitor (e.g., the capacitor 755 of FIG. 7) configured to charge using the direct current power.

According to various example embodiments, the wireless power module may be configured to transmit the alarm signal based on a charge amount charged at the capacitor exceeding a specific value.

According to various example embodiments, the wireless power module may further include a low dropout (LDO) regulator (e.g., the LDO regulator 757 of FIG. 7) configured to operate based on a charge amount charged at the capacitor exceeding a specific value.

According to various example embodiments, the wireless power module may be configured to transmit the alarm signal based on power being output from the LDO regulator.

According to various example embodiments, the antenna may include an NFC antenna or a wireless charging antenna.

According to various example embodiments, the electronic device may include a smartphone, a smart watch, or a stylus pen, with at least one non-physical key.

Figure 8:
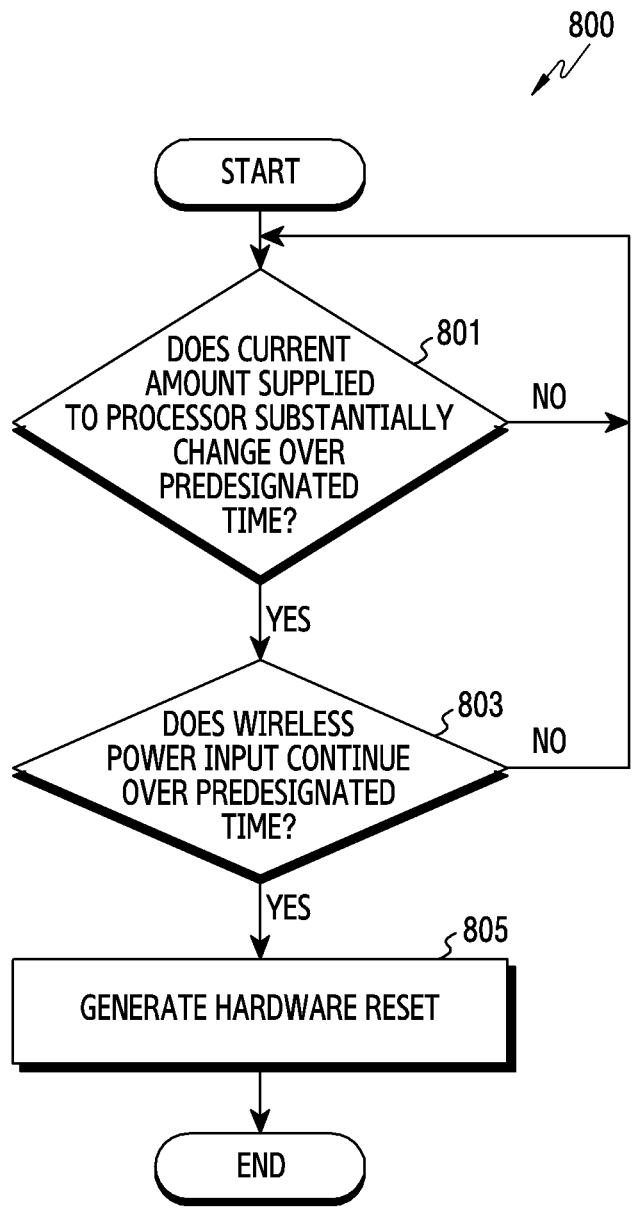
FIG. 8 is a flowchart illustrating an example method for generating a hardware reset signal in an electronic device according to various embodiments.

FIG. 8 is a flowchart 800 illustrating an example method for generating a hardware reset signal in an electronic device 100 or 400 according to various embodiments. The operating entity of the flowchart 800 of FIG. 8 may be understood as the electronic device (e.g., the electronic device 100 of FIG. 1, or the electronic device 400 of FIG. 4) or an PMIC (e.g., the PMIC 720 of FIG. 7) of the electronic device.

According to various embodiments, in operation 801, the electronic device 100 or 400 may determine whether the current amount supplied to the processor 740 substantially changes over a predesignated time (e.g., 7 seconds). If the processor 740 is locked, the processor 740 may repeat the same operation due to a software or application fault and the current amount supplied to the processor 740 may not change or may change within a fine range. Hence, if the current amount supplied to the processor 740 does not substantially change over the predesignated time, the electronic device 100 or 400 may determine the processor 740 is locked and the hardware reset is required.

According to various embodiments, if determining that the current amount supplied to the processor 740 does not substantially change over the predesignated time in operation 801, the electronic device 100 or 400 may determine whether a wireless power input is maintained over a predesignated time in operation 803. Since an electronic device without a physical key may not provide the hardware reset using the physical key as in the conventional electronic device, it may provide a hardware reset input by detecting the wireless power input for receiving the input regardless of the operation of the processor 740. Thus, if determining that the wireless power input is maintained over the predesignated time in operation 803, the electronic device 100 or 400 may generate and provide a hardware reset signal to the processor 740 in operation 805.

Figure 9A:
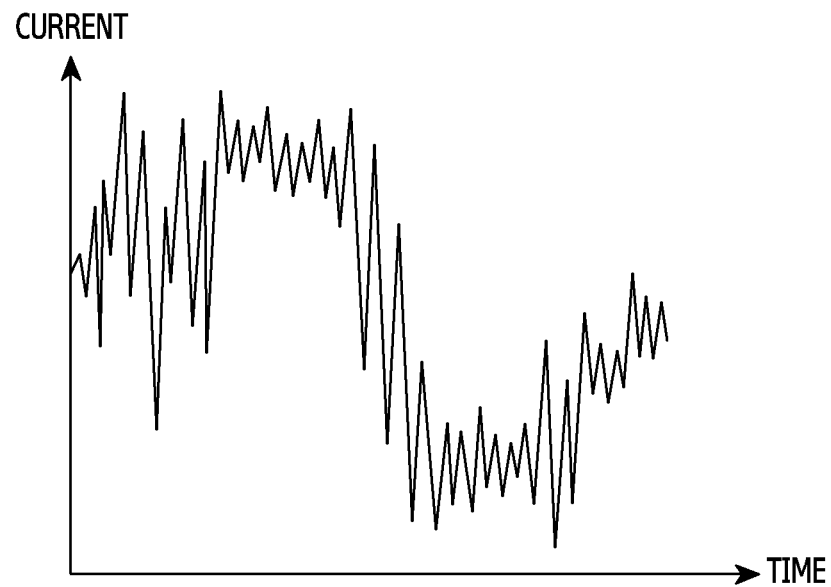
FIG. 9A is a graph illustrating an example of a current amount according to a state of an electronic device according to various embodiments.

FIG. 9A is a graph illustrating an example of a current amount according to a state of an electronic device according to various embodiments.

FIG. 9A depicts the current amount supplied to a processor (e.g., the processor 740 of FIG. 7) of an electronic device (e.g., the electronic device 100 of FIG. 1, or the electronic device 400 of FIG. 4) in the normal state.

Referring to FIG. 9A, if the electronic device 100 or 400 is in the normal state, an PMIC (e.g., the PMIC 720 of FIG. 7) may supply power to the processor 740. In an embodiment, if the electronic device 100 or 400 is in the normal state, the current amount supplied to the processor 740 may change. For example, the user of the electronic device 100 or 400 may turn on a display, execute an application, or increase a volume, and the current amount required for the operations may change. In an embodiment, the current amount supplied to the processor 740 of the electronic device 100 or 400 may change based on time.

Figure 9B:
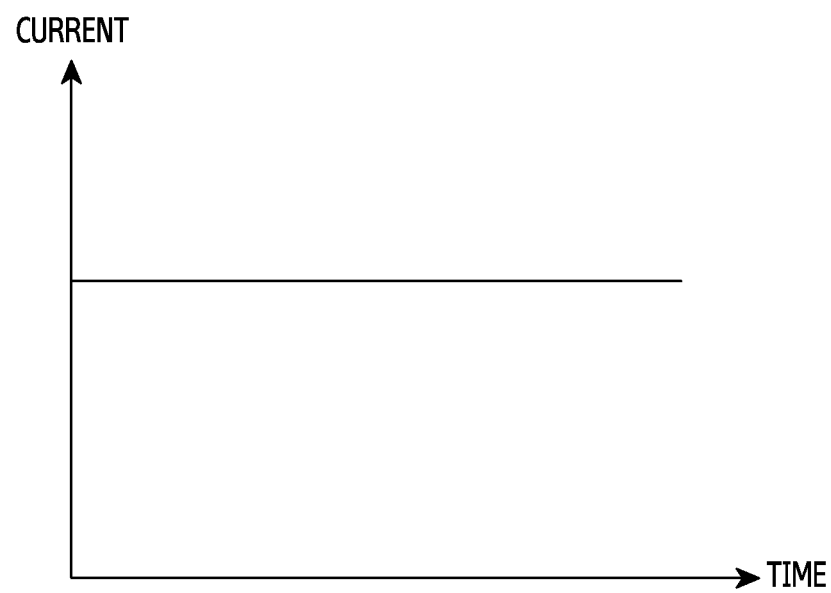
FIG. 9B is a graph illustrating an example of a current amount according to the state of the electronic device according to various embodiments.

FIG. 9B is a graph illustrating an example of the current amount supplied to the processor of the locked electronic device according to various embodiments.

Referring to FIG. 9B, if the electronic device 100 or 400 is in the lock state, the current amount supplied to the processor 740 may not substantially change. In an embodiment, during application execution, the electronic device 100 or 400 may stop the application due to an application error. The current amount supplied to the processor 740 may change within a fine range due to the infinite loop at the same position due to the application error, or maintain. In an embodiment, if the current amount supplied to the processor 740 does not substantially change, the PMIC (e.g., the PMIC 720 of FIG. 7) may may determine that the electronic device 100 or 400 is locked. In an embodiment, if the current amount supplied to the processor 740 does not substantially change, the PMIC (e.g., the PMIC 720 of FIG. 7) may may determine that the electronic device 100 or 400 requires the hardware reset. In an embodiment, the electronic device 100 or 400 may perform the hardware reset by receiving the wireless power from outside (e.g., the external device 770 of FIG. 7). In an embodiment, if the electronic device 100 or 400 conducts the hardware reset, the processor 740 may restart and restore the normal state.

Figure 10:
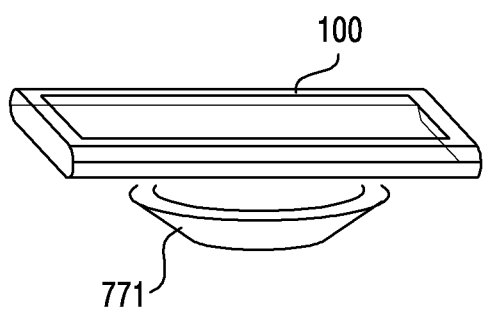
FIG. 10 is a diagram illustrating an example of wireless power supply from a wireless charger to an electronic device which is locked according to various embodiments.

FIG. 10 is a diagram illustrating an example of wireless power supply from a wireless charger to an electronic device which is locked according to various embodiments.

Referring to FIG. 10, the locked electronic device 100 may receive power through a wireless charger 771. In an embodiment, for the locked electronic device 100, the wireless charger 771 may wirelessly provide the power to the electronic device 100, if determining approach or contact of the electronic device 100. In an embodiment, a wireless power module (e.g., the wireless power module 750 of FIG. 7) may receive the power from the wireless charger 771. In an embodiment, an PMIC (e.g., the PMIC 720 of FIG. 7) may determine that the electronic device 100 is locked, and the wireless power module 750 may transmit an alarm signal to the PMIC 720 through a signal line (e.g., the signal line 760 of FIG. 7). For example, if the electronic device 100 is locked, the user may put the electronic device 100 near or on the wireless charger 771. The electronic device 100 receiving the wireless power from the wireless charger 771 may perform hardware reset.

Figure 11:
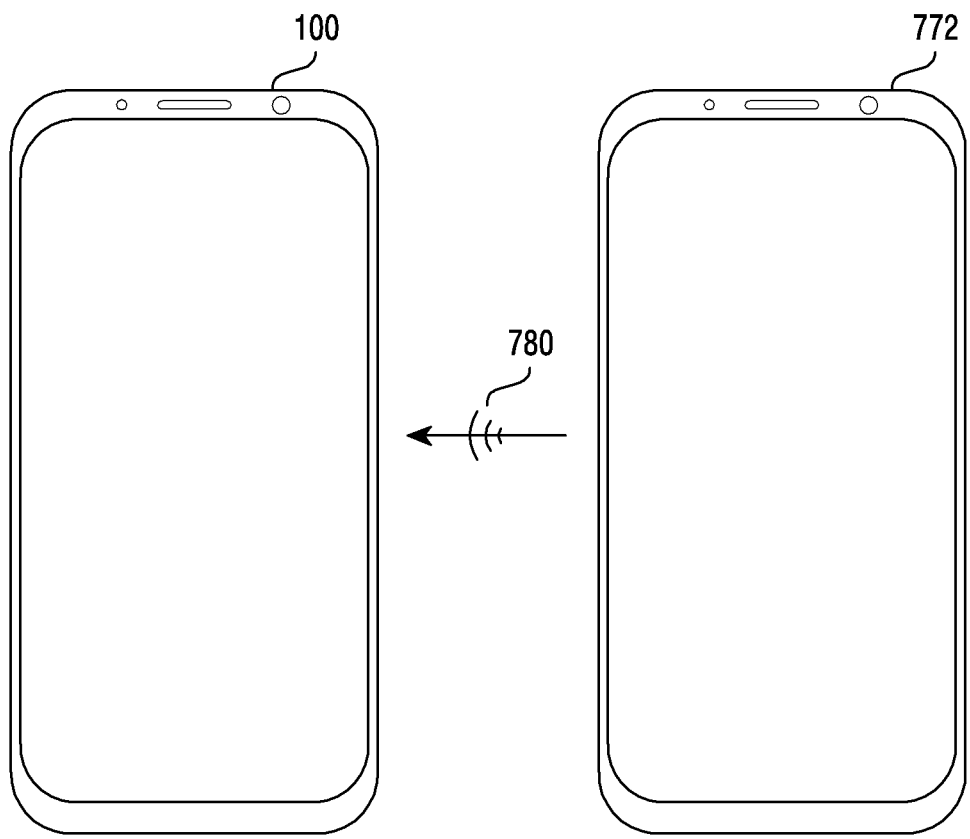
FIG. 11 is a diagram illustrating an example of wireless power supply from an external terminal to an electronic device which is locked according to various embodiments.

FIG. 11 is a diagram illustrating an example of wireless power supply from an external terminal to an electronic device which is locked according to various embodiments. Corresponding, identical or similar descriptions shall be omitted in FIG. 11. Referring to FIG. 11, the electronic device 100 may determine that a current amount supplied to a processor (e.g., the processor 740 of FIG. 7) does not substantially change over a predesignated time, and determine that the electronic device 100 is locked. In an embodiment, the locked electronic device 100 may receive the power through another terminal 772. In an embodiment, the another terminal 772 may perform magnetic field communication 780. For example, the terminal 772 may perform the magnetic field communication 780 with the electronic device 100, if the user turns the NFC function on or executes a wireless battery sharing function. If a physical distance between the electronic device 100 and the another terminal 772 falls below a threshold, the another terminal 772 may supply the power to the electronic device 100 by conducting the magnetic field communication 780. In an embodiment, if a wireless power module (e.g., the wireless power module 750 of FIG. 7) of the electronic device 100 receives the wireless power from the another terminal 772, the wireless power module 750 may transmit an alarm signal to a PMIC (e.g., the PMIC 720 of FIG. 7) of the electronic device 100. In an embodiment, if the PMIC 720 continuously receives the alarm signal over a specific time, the electronic device 100 may perform hardware reset.

According to various example embodiments, a method of operating of an electronic device (e.g., the electronic device 100 of FIG. 1 or the electronic device 400 of FIG. 4) having at least one non-physical key may include: detecting a current amount supplied to a processor, detecting whether wireless power is input, generating a hardware reset signal based on the detected current amount and the wireless power input, and transmitting the generated hardware reset signal to the processor.

According to various example embodiments, generating the hardware reset signal based on the detected current amount and the wireless power input may include, based on the detected current amount having no substantial change and the wireless power being input, generating the hardware reset signal.

According to various example embodiments, generating the hardware reset signal based on the detected current amount and the wireless power input may include, based on the detected current amount having no substantial change over a first predesignated time and the wireless power being input, generating the hardware reset signal.

According to various example embodiments, generating the hardware reset signal based on the detected current amount and the wireless power input may include, based on the detected current amount having no substantial change over a first predesignated time and the wireless power being input over a second predesignated time, generating the hardware reset signal.

The disclosure according to various example embodiments provides a method for hardware reset if a system is locked in a keyless electronic device (e.g., an electronic device having at least one non-physical/external key). Thus, the electronic device in the keyless structure may achieve aesthetic improvement of the electronic device.

Figure 12:
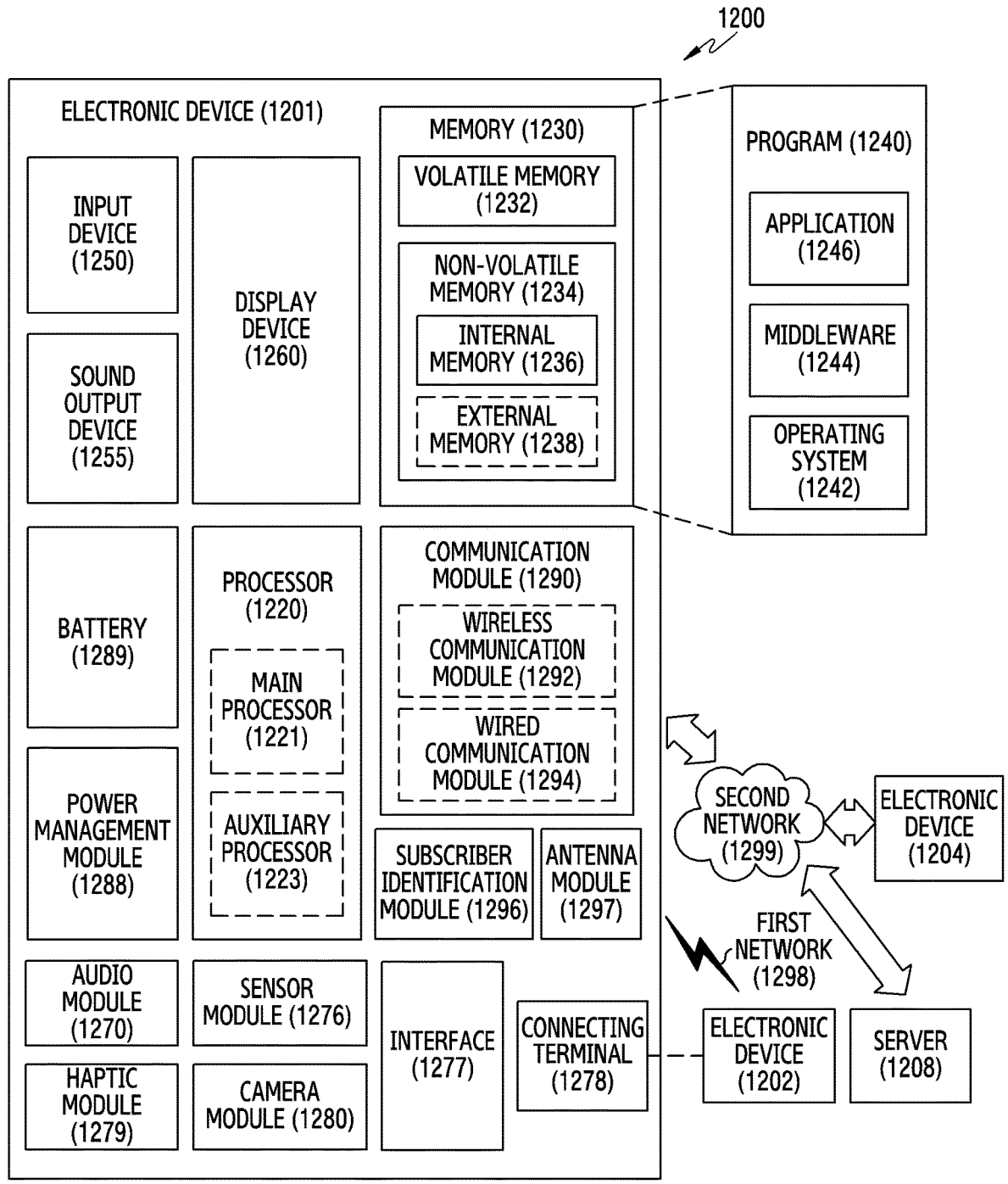
FIG. 12 is a block diagram illustrating an example electronic device in a network environment according to various embodiments.

FIG. 12 is a block diagram illustrating an example electronic device 1201 in a network environment 1200 according to various embodiments. Referring to FIG. 12, the electronic device 1201 in the network environment 1200 may communicate with an electronic device 1202 via a first network 1298 (e.g., a short-range wireless communication network), or an electronic device 1204 or a server 1208 via a second network 1299 (e.g., a long-range wireless communication network). According to an embodiment, the electronic device 1201 may communicate with the electronic device 1204 via the server 1208. According to an embodiment, the electronic device 1201 may include a processor 1220, memory 1230, an input device 1250, a sound output device 1255, a display device 1260, an audio module 1270, a sensor module 1276, an interface 1277, a haptic module 1279, a camera module 1280, a power management module 1288, a battery 1289, a communication module 1290, a subscriber identification module (SIM) 1296, or an antenna module 1297. In some embodiments, at least one (e.g., the display device 1260 or the camera module 1280) of the components may be omitted from the electronic device 1201, or one or more other components may be added in the electronic device 1201. In some embodiments, some of the components may be implemented as single integrated circuitry. For example, the sensor module 1276 (e.g., a fingerprint sensor, an iris sensor, or an illuminance sensor) may be implemented as embedded in the display device 1260 (e.g., a display).

The processor 1220 may execute, for example, software (e.g., a program 1240) to control at least one other component (e.g., a hardware or software component) of the electronic device 1201 coupled with the processor 1220, and may perform various data processing or computation. According to an embodiment, as at least part of the data processing or computation, the processor 1220 may load a command or data received from another component (e.g., the sensor module 1276 or the communication module 1290) in volatile memory 1232, process the command or the data stored in the volatile memory 1232, and store resulting data in non-volatile memory 1234. According to an embodiment, the processor 1220 may include a main processor 1221 (e.g., a central processing unit (CPU) or an application processor (AP)), and an auxiliary processor 1223 (e.g., a graphics processing unit (GPU), an image signal processor (ISP), a sensor hub processor, or a communication processor (CP)) that is operable independently from, or in conjunction with, the main processor 1221. Additionally or alternatively, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control at least some of functions or states related to at least one component (e.g., the display device 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment, the auxiliary processor 1223 (e.g., an image signal processor or a communication processor) may be implemented as part of another component (e.g., the camera module 1280 or the communication module 1290) functionally related to the auxiliary processor 1223.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input device 1250 may receive a command or data to be used by other component (e.g., the processor 1220) of the electronic device 1201, from the outside (e.g., a user) of the electronic device 1201. The input device 1250 may include, for example, a microphone, a mouse, a keyboard, or a digital pen (e.g., a stylus pen).

The sound output device 1255 may output sound signals to the outside of the electronic device 1201. The sound output device 1255 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1260 may visually provide information to the outside (e.g., a user) of the electronic device 1201. The display device 1260 may include, for example, a display, a hologram device, or a projector and control circuitry to control a corresponding one of the display, hologram device, and projector. According to an embodiment, the display device 1260 may include touch circuitry adapted to detect a touch, or sensor circuitry (e.g., a pressure sensor) adapted to measure the intensity of force incurred by the touch.

The audio module 1270 may convert a sound into an electrical signal and vice versa. According to an embodiment, the audio module 1270 may obtain the sound via the input device 1250, or output the sound via the sound output device 1255 or a headphone of an external electronic device (e.g., an electronic device 1202) directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment, the interface 1277 may include, for example, a high definition multimedia interface (HDMI), a universal serial bus (USB) interface, a secure digital (SD) card interface, or an audio interface.

A connecting terminal 1278 may include a connector via which the electronic device 1201 may be physically connected with the external electronic device (e.g., the electronic device 1202). According to an embodiment, the connecting terminal 1278 may include, for example, a HDMI connector, a USB connector, a SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to the electronic device 1201. According to an embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or infrared data association (IrDA)) or the second network 1299 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The antenna module 1297 may transmit or receive a signal or power to or from the outside (e.g., the external electronic device) of the electronic device 1201. According to an embodiment, the antenna module 1297 may include an antenna including a radiating element including a conductive material or a conductive pattern formed in or on a substrate (e.g., PCB). According to an embodiment, the antenna module 1297 may include a plurality of antennas. In such a case, at least one antenna appropriate for a communication scheme used in the communication network, such as the first network 1298 or the second network 1299, may be selected, for example, by the communication module 1290 (e.g., the wireless communication module 1292) from the plurality of antennas. The signal or the power may then be transmitted or received between the communication module 1290 and the external electronic device via the selected at least one antenna. According to an embodiment, another component (e.g., a radio frequency integrated circuit (RFIC)) other than the radiating element may be additionally formed as part of the antenna module 1297.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1201 and the external electronic device 1204 via the server 1208 coupled with the second network 1299. Each of the electronic devices 1202 and 1204 may be a device of a same type as, or a different type, from the electronic device 1201. According to an embodiment, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1240) including one or more instructions that are stored in a storage medium (e.g., internal memory 1236 or external memory 1238) that is readable by a machine (e.g., the electronic device 1201). For example, a processor (e.g., the processor 1220) of the machine (e.g., the electronic device 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Various embodiments of the disclosure may provide a method for performing hardware reset on an electronic device if an error occurs at an input sensor module in a keyless electronic device (e.g., an electronic device including at least one non-physical key).

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents.

What is claimed is:

1. An electronic device comprising:
   a wireless power module including circuitry configured to receive wireless power;
   a processor; and
   a power management integrated circuit (PMIC) configured to manage power supplied to the processor,
   wherein the wireless power module, the processor, and the PMIC are connected to a line configured to transmit an alarm signal notifying that the wireless power is input, and
   based on a current amount supplied to the processor having no substantial change and the alarm signal notifying that the wireless power input is received from the wireless power module, the PMIC is configured to generate and transmit a hardware reset signal for hardware reset to the processor.

2. The electronic device of claim 1, wherein the electronic device comprises at least one non-physical key.

3. The electronic device of claim 1, wherein, based on the current amount supplied to the processor having no substantial change over a first predesignated time, the PMIC is configured to generate and transmit the hardware reset signal to the processor.

4. The electronic device of claim 1, wherein, based on the current amount supplied to the processor having no substantial change over a first predesignated time and the alarm signal notifying the wireless power input being received from the wireless power module over a second predesignated time, the PMIC is configured to generate and transmit the hardware reset signal to the processor.

5. The electronic device of claim 1, wherein the wireless power module comprises:
   an antenna configured to receive wireless power;

a rectifier configured to convert alternating current power received via the antenna to direct current power; and
a capacitor configured to charge using the direct current power.

6. The electronic device of claim 5, wherein the wireless power module is configured to transmit the alarm signal based on a charge amount charged at the capacitor exceeding a specific value.

7. The electronic device of claim 5, wherein the wireless power module further comprises:
a low dropout (LDO) regulator configured to operate based on a charge amount charged at the capacitor exceeding a specific value.

8. The electronic device of claim 7, wherein the wireless power module is configured to transmit the alarm signal based on power being output from the LDO regulator.

9. The electronic device of claim 5, wherein the antenna includes a near field communication (NFC) antenna or a wireless charging antenna.

10. The electronic device of claim 1, wherein the electronic device includes a smartphone, a smart watch, or a stylus pen, with at least one non-physical key.

11. A method of operating an electronic device, comprising:
detecting a current amount supplied to a processor;
detecting whether wireless power is input;
generating a hardware reset signal based on the detected current amount and the wireless power input; and
transmitting the generated hardware reset signal to the processor,
wherein generating the hardware reset signal based on the detected current amount and the wireless power input comprises:
based on the detected current amount having no substantial change and the wireless power being input, generating the hardware reset signal.

12. The method of claim 11, wherein the electronic device comprises at least one non-physical key.

13. The method of claim 11, wherein generating the hardware reset signal based on the detected current amount and the wireless power input comprises:
based on the detected current amount having no substantial change over a first predesignated time and the wireless power being input, generating the hardware reset signal.

14. The method of claim 11, wherein generating the hardware reset signal based on the detected current amount and the wireless power input comprises:
based on the detected current amount having no substantial change over a first predesignated time and the wireless power being input over a second predesignated time, generating the hardware reset signal.

15. The method of claim 11, wherein detecting whether the wireless power is input comprises:
receiving an alarm signal from a wireless power module based on a charge amount charged at a capacitor exceeding a specific value.

* * * * *